(12) United States Patent
Jiang et al.

(10) Patent No.: US 10,754,865 B2
(45) Date of Patent: Aug. 25, 2020

(54) SYSTEM AND METHOD FOR MINING USER CYCLE MODE

(71) Applicant: TONGJI UNIVERSITY, Shanghai (CN)

(72) Inventors: Changjun Jiang, Shanghai (CN); Chungang Yan, Shanghai (CN); Hongzhong Chen, Shanghai (CN); Zhijun Ding, Shanghai (CN); Bing Xu, Shanghai (CN)

(73) Assignee: TONGJI UNIVERSITY, Yangpu District, Shanghai (CN)

( * ) Notice: Subject to any disclaimer, the term of this patent is extended or adjusted under 35 U.S.C. 154(b) by 190 days.

(21) Appl. No.: 15/770,728

(22) PCT Filed: Jan. 15, 2016

(86) PCT No.: PCT/CN2016/070990
§ 371 (c)(1),
(2) Date: Apr. 24, 2018

(87) PCT Pub. No.: WO2017/071125
PCT Pub. Date: May 4, 2017

(65) Prior Publication Data
US 2019/0087470 A1    Mar. 21, 2019

(30) Foreign Application Priority Data
Oct. 28, 2015   (CN) .......................... 2015 1 0714206

(51) Int. Cl.
*G06F 16/00* (2019.01)
*G06F 16/2458* (2019.01)
(Continued)

(52) U.S. Cl.
CPC .......... *G06F 16/2465* (2019.01); *G06F 16/00* (2019.01); *G06F 16/24578* (2019.01); *G06F 16/9537* (2019.01); *G06F 2216/03* (2013.01)

(58) Field of Classification Search
None
See application file for complete search history.

(56) References Cited

U.S. PATENT DOCUMENTS

| | | | |
|---|---|---|---|
| 2015/0206440 A1* | 7/2015 | Aylesworth | G09B 5/00 434/362 |
| 2017/0039336 A1* | 2/2017 | Bitran | G06Q 10/10 |
| 2017/0039480 A1* | 2/2017 | Bitran | G06F 19/3481 |

FOREIGN PATENT DOCUMENTS

| CN | 101266610 A | 9/2008 |
|---|---|---|
| CN | 101355504 A | 1/2009 |

(Continued)

OTHER PUBLICATIONS

Xi, Yuanhong, "Research on Time Series Data Mining of Partial Periodic Patterns", Electronic Technology & Information Science, China Master's Theses Full-Text Database, No. 4, Apr. 15, 2012 (Apr. 15, 2012), pp. 9 and I3-14.

(Continued)

*Primary Examiner* — Son T Hoang
(74) *Attorney, Agent, or Firm* — Global IP Services; Tianhua Gu

(57) ABSTRACT

A method for mining user cyclic patterns comprises steps: S1: a user behavior recording module recording time of behaviors of each user; S2: a user behavior time sequence generation module performing batch processing to the behaviors of each user to generate a time sequence of the behaviors of the user by using day as time granularity; and S3: a user behavior cyclic pattern acquisition module gen- (Continued)

erating time sequence cyclic patterns from the time sequence according to frequent patterns.

4 Claims, 3 Drawing Sheets

(51) Int. Cl.
*G06F 16/9537* (2019.01)
*G06F 16/2457* (2019.01)

(56) References Cited

FOREIGN PATENT DOCUMENTS

| CN | 103458456 A | 12/2013 |
|---|---|---|
| CN | 105224685 A | 1/2016 |

OTHER PUBLICATIONS

Wang, Ruiwei, "Research on Time Series Data Mining Algorithm of Partial Periodic Patterns", Electronic Technology & Information Science, China Master's Theses Full-Text Database, No. 8, Aug. 15, 2009 (Aug. 15, 2009), pp. 6 and 16-I7.

\* cited by examiner

SYSTEM AND METHOD FOR MINING USER CYCLE MODE

CROSS REFERENCE TO RELATED PATENT APPLICATION

The present application is the US national stage of PCT/CN2016/070990 filed on Jan. 15, 2016, which claims the priority of the Chinese patent application No. CN201510714206.5 filed on Oct. 28, 2015, which application is incorporated herein by reference.

BACKGROUND OF THE PRESENT INVENTION

Field of Invention

The present invention relates to the technical field of period pattern mining, in particular to a system and a method for mining user cyclic patterns.

Description of Related Arts

In the LBSN field, user behavior patterns have been widely studied and many study results are produced. For example, by statistically analyzing places at which users arrive, it is found that categories of places to which the users go at different time periods in a day are approximately the same. By mining frequent sequences of user driving sequences, rules of sequences that the users arrive at some places can be found. Similarly, cyclic behaviors also belong to one type of user behavior patterns. Directions of studies on cyclic behaviors are mainly divided into two types: cyclic acquisition and cyclic pattern mining, wherein a major task of cyclic acquisition is to acquire a cycle that a certain user arrives at a certain place, and a major task of cyclic pattern mining is to find a pattern of occurrence of the cycle that that the user arrives at a certain place and the specific task is to mine a cyclic pattern that the user arrives at this place in a given cycle.

At present, cyclic pattern algorithms are mainly based on thoughts of frequent pattern mining algorithms. A cyclic pattern mining algorithm based on A prior thought has already been put forward and makes a reference to thoughts such as that sub-patterns in frequent patterns are also frequent patterns in frequent pattern mining algorithms. The algorithm complexity of the frequent cyclic pattern mining algorithm based on the A prior algorithm thought depends on size of a given period, and a raw data set needs to be repetitively scanned when frequent cyclic patterns are acquired.

SUMMARY OF THE PRESENT INVENTION

In view of the above-mentioned disadvantages in the prior art, the purpose of the present invention is to provide a system and a method for mining user cyclic patterns, which can accurately acquire cyclic patterns in a time sequence and can reduce a great number of I/O operations by scanning a raw data set twice, such that not only can the execution efficiency be improved, but also the memory occupied for acquiring the cyclic patterns from raw data can be reduced.

In order to realize the above-mentioned purpose and other related purposes, the present invention provides a system for mining user cyclic patterns, at least comprising: a user behavior recording module used for recording time of behaviors of each user; a user behavior time sequence generation module connected with the user behavior recording module and used for performing batch processing to the behaviors of each user to form a time sequence of the behaviors of the user; and a user behavior cyclic pattern acquisition module connected with the user behavior time sequence generation module and used for generating cyclic patterns from the time sequence according to frequent patterns.

Preferably, the user behavior time sequence generation module generates the time sequence of the behaviors of the user by using day as time granularity.

Preferably, the system for mining user cyclic patterns further comprises a user cyclic pattern storage module which is connected with the user behavior cyclic pattern acquisition module and is used for receiving the cyclic patterns generated by the user behavior cyclic pattern acquisition module.

Preferably, the user cyclic pattern storage module stores the cyclic patterns in a database of the user cyclic pattern storage module.

Preferably, the user cyclic pattern storage module stores user IDs and cycles in the database of the user cyclic pattern storage module.

A method for mining user cyclic patterns comprises the following steps: S1: a user behavior recording module recording time of behaviors of each user; S2: a user behavior time sequence generation module performing batch processing to the behaviors of each user to generate a time sequence of the behaviors of the user by using day as time granularity; and S3: a user behavior cyclic pattern acquisition module generating time sequence cyclic patterns from the time sequence according to frequent patterns.

Preferably, the method for mining user cyclic patterns further comprises the following step:

S4: a user cyclic pattern storage module receiving the cyclic patterns generated by the user behavior cyclic pattern acquisition module, and storing the cyclic patterns, user IDs and cycles in a database of the user cyclic pattern storage module.

A specific implementation process of step S3 comprises the following steps:

S3-1: reading the time sequence for a first time, segmenting the time sequence into sub-sequences according to magnitude of cycles, simultaneously adding each element in each sub-sequence to a position in the current sub-sequence, transforming the time sequence into item sets and statistically collecting times of occurrence of each item set in a data set;

S3-2: ranking items in each item set according to times of occurrence of the items in the data set from large to small;

S3-3: removing the items which do not satisfy minimum times of occurrence according to the times of occurrence of the items;

S3-4: sequentially reading the item sets, creating an FP-Tree, creasing a header table, creating a conditional pattern tree from the last item as a conditional pattern base and establishing a new header table, wherein a combination of conditional patterns and items in the header table is output as a frequent pattern; and S3-5: acquiring all frequent patterns of the data set and generating the time sequence cyclic patterns according to the frequent patterns.

Preferably, in step S3, all frequent patterns of the data set are acquired by means of recursion according to a depth-first rule.

Preferably, in step S3, a raw data set is scanned only twice.

The system and the method for mining user cyclic patterns provided by the present invention have the following beneficial effects:

The present invention provides a cyclic pattern mining method based on item position information and an FP-Growth algorithm thought. According to the present invention, the cyclic patterns in the time sequence can be accurately acquired; a great number of I/O operations can be reduced by scanning a raw data set twice; and by combining item position information and establishing an FP-Tree, not only can the execution efficiency of an algorithm be improved, but also the memory occupied for acquiring the cyclic patterns from raw data can be reduced. The time complexity of the algorithm provided by the present invention is O(n log n) and the space complexity is n. As compared with the existing cyclic pattern acquisition algorithms, the execution efficiency is higher.

DESCRIPTION OF COMPONENT MARK NUMBERS

S1-S4 Steps

DETAILED DESCRIPTION OF THE PREFERRED EMBODIMENTS

Figure 1:
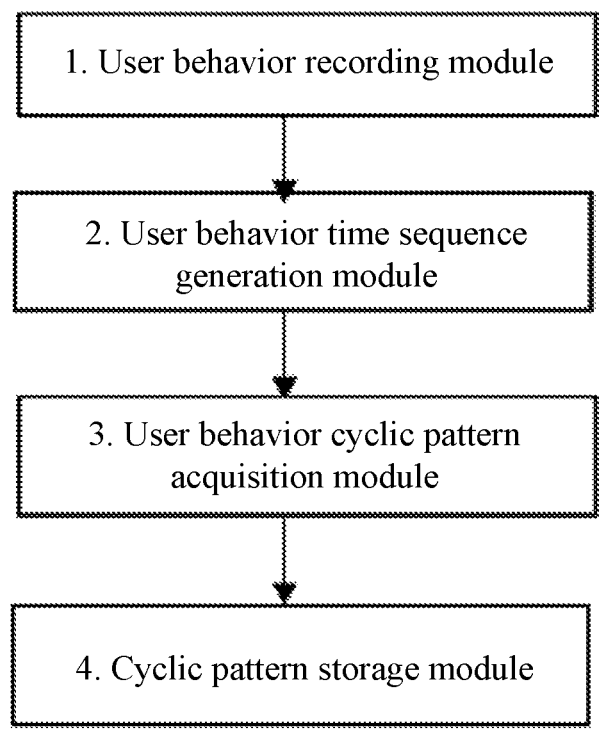
FIG. 1 illustrates a diagram of a system for mining user cyclic patterns provided in an embodiment.

Time sequence cyclic patterns are similar to correlated patterns, a major difference lies in that at least one of correlations between data in a time sequence pattern is time dimension, and thereby the entire correlated pattern is associated with time. For matters which are considered by a time sequence pattern, not only whether an event occurs be considered, but also critically the occurrence time of the event need be considered. It may be considered as a special example of a correlation model and it adds a time attribute in the correlation model. It is used for predicting future data from historical data and current data according to time sequence type data.

Time sequence cyclic patterns are used for finding a processing model of correlation between data in a certain time period and predicting a distribution situation of values which will possibly occur in future according to a trend of change of data with time.

Mining based on one or more time sequence data is time sequence data mining. It can extract internal rules of time sequences for analysis, prediction numerical values, cycles and trends of time sequences.

A major difference of a time sequence database from a common database lies in the possession of a time dimension and a special place of the time dimension in all columns of the database. Correspondingly, a feature of mining work aiming at a time sequence data set is greatly different from a feature of mining work aiming at a common data set. Multiple time dimensions t1, t2 . . . are transformed into a single time dimension t. and other time dimensions are merged into one time dimension mainly through preprocessing in the present invention.

A basic feature of mining of time sequence data is that target matters concerned by us are somehow associated with the time dimension, i.e., a matter which is concerned about by time sequence pattern mining is t→b (b is a target matter), i.e., what feature or characteristic a certain concerned matter has in time or what event will occur at some special time.

For the algorithm in the present invention, minimum occurrence times need to be set. If occurrence times of a certain cyclic pattern are greater than the minimum occurrence times, this pattern is a correct cyclic pattern of a time sequence. Thereby, users can be enabled to focus on expected cyclic events, and not only the efficiency of mining work can be improved, but also the reliability of mining results can be improved. A basic thought of the present invention is to transform acquisition of cyclic patterns into acquisition of frequent patterns. Therefore, times of occurrence of frequent patterns correspond to times of occurrence of cyclic patterns. If times of occurrence of a certain pattern are greater than minimum times of occurrence, a cyclic pattern corresponding to this pattern is a correct cyclic pattern of a time sequence.

The implementation modes of the present invention will be described below through specific embodiments. One skilled in the art can easily understand other advantages and effects of the present invention according to contents disclosed by the description. The present invention may also be implemented or applied through other different specific implementation modes. Various modifications or changes may also be made to all details in the description based on different points of view and applications without departing from the spirit of the present invention.

Please refer to the drawings. It needs to be stated that the drawings provided in the following embodiments are just used for schematically describing the basic concept of the present invention, thus only illustrate components only related to the present invention and are not drawn according to the numbers, shapes and sizes of components during actual implementation, the configuration, number and scale of each component during actual implementation thereof may be freely changed, and the component layout configuration thereof may be more complex.

The present invention will be described below in detail with reference to the drawings in combination with the embodiments.

The embodiment provides a system for mining user cyclic patterns. As illustrated in FIG. 1, the system for mining user cyclic patterns comprises:

a user behavior recording module used for recording time of behaviors of each user;

a user behavior time sequence generation module connected with the user behavior recording module and used for generating a time sequence of the behaviors of the user by using day as time granularity, wherein different states of user behaviors are identified by using characters;

a user behavior cyclic pattern acquisition module connected with the user behavior time sequence generation module and used for generating cyclic patterns from the time sequence according to frequent patterns; and a user cyclic pattern storage module connected with the user behavior cyclic pattern acquisition module, and used for receiving the cyclic patterns generated by the user behavior cyclic pattern acquisition module and storing the cyclic patterns, user IDs and cycles in a database of the user cyclic pattern storage module.

Figure 2:
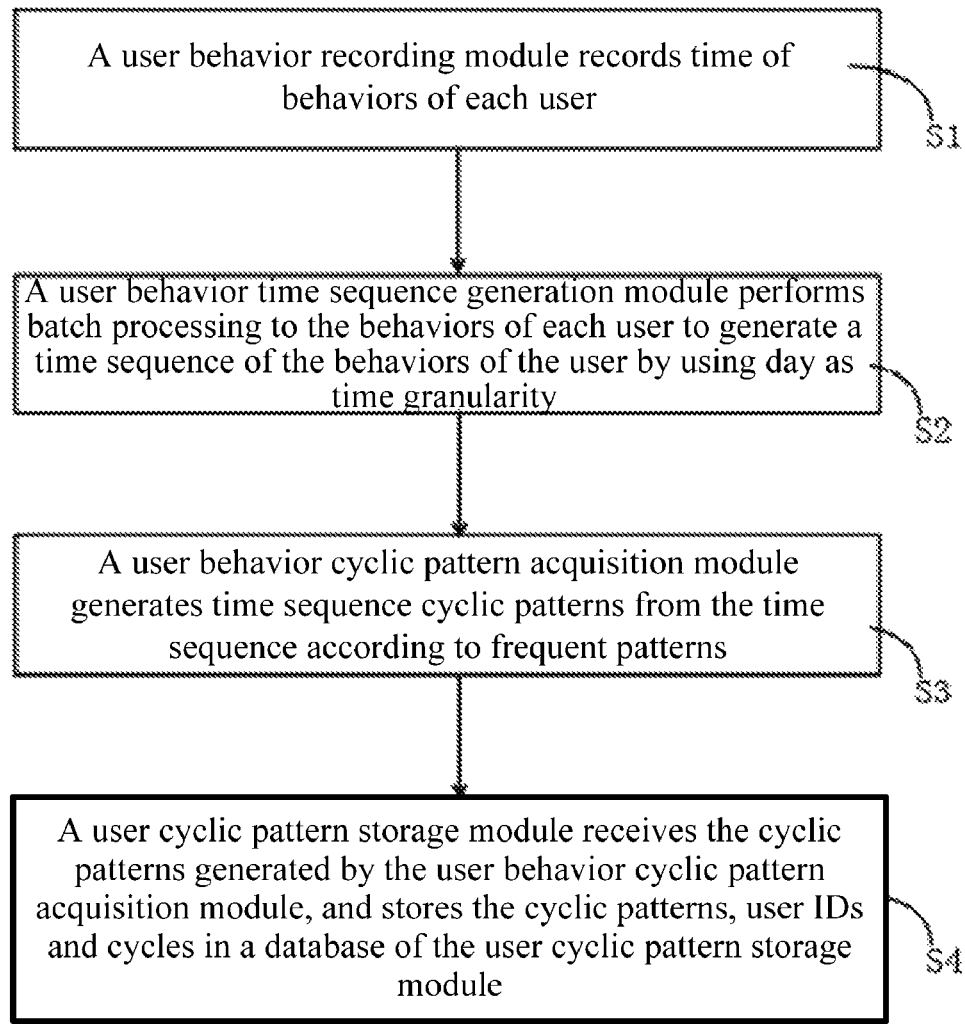
FIG. 2 illustrates a flowchart of a method for mining user cyclic patterns provided in an embodiment.

The embodiment further provides a method for mining user cyclic patterns. As illustrated in FIG. 2, the method comprises the following steps:

In step S1, a user behavior recording module records time of behaviors of each user.

In step S2, a user behavior time sequence generation module performs batch processing to the behaviors of each user to generate a time sequence of the behaviors of the user by using day as time granularity.

In step S3, a user behavior cyclic pattern acquisition module generates time sequence cyclic patterns from the time sequence according to frequent patterns:

when the time sequence is read for a first time, the time sequence is segmented into sub-sequences according to size of cycles, simultaneously each element in each sub-sequence is added to a position in the current sub-sequence, the time sequence is transformed into item sets and times of occurrence of each item set in a data set are statistically collected;

items in each item set are ranked in a sequence of occurrence times of the items in the data set from large to small;

the items which do not satisfy minimum times of occurrence are removed according to the times of occurrence of the items, the item sets are sequentially read, an FP-Tree is created, a header table is created, a conditional pattern tree is created from the last item of the header table as a conditional pattern base and a new header table is established, wherein a combination of conditional patterns and items in the header table is output as a frequent pattern; and all frequent patterns of the data set are acquired by means of recursion according to a depth-first rule and the time sequence cyclic patterns are generated according to the frequent patterns.

In step S4, a user cyclic pattern storage module receives the cyclic patterns generated by the user behavior cyclic pattern acquisition module, and stores the cyclic patterns, user IDs and cycles in a database of the user cyclic pattern storage module.

Figure 3:
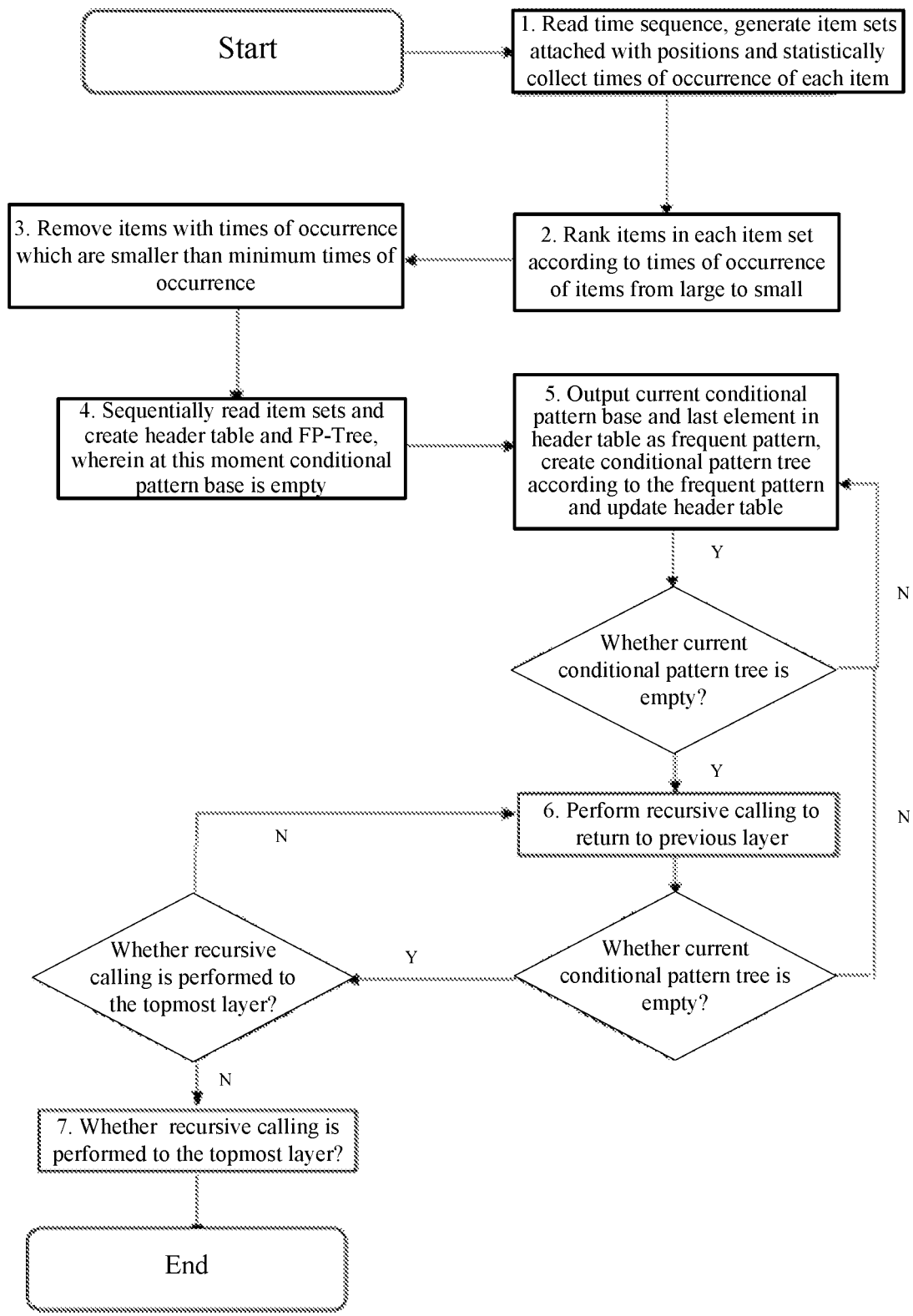
FIG. 3 illustrates a flowchart of acquisition method for a time sequence cyclic pattern provided in an embodiment.

A main process of acquiring time sequence cyclic patterns involved in step S3, as illustrated in FIG. 3, specifically comprises the following steps:

In step 1, a time sequence is read, item sets attached with positions are generated and occurrence times of each item are statistically collected:

when the time sequence is read for a first time, the time sequence is segmented into sub-sequences according to magnitude of cycles and the sub-sequences are transformed into item sets, wherein each item is attached information of a position in the current sub-sequence, and times of occurrence of the items with the same value and at the same position in the entire data set are statistically collected.

In step 2, items in each item set are ranged in a sequence of from large to small of occurrence times of the items:

items in each item set are ranked according to times of occurrence of the items in the entire data set from large to small, a quick ranking method is adopted in this step and the time complexity is $O(n \log n)$.

In step 3, the items with times of occurrence are smaller than minimum times of occurrence are removed.

In step 4, all item sets in the data set are sequentially read and a header table and an FP-Tree are created, wherein at this moment a conditional pattern base is empty.

In step 5, a current conditional pattern base and the last element in the header table are output as a frequent pattern, a conditional pattern tree is created according to the frequent pattern and the header table is updated:

from the last item of the header table, a combination of a current item and the current conditional pattern base forms a frequent pattern, and an FP-Tree is established by taking the frequent pattern as a latest conditional pattern base; if the FP-Tree is non-empty, continue with step 5; and if the FP-Tree is empty, turn to step 6.

In step 6, recursive calling is performed to return to a previous layer:

if the current FP-Tree is empty, recursive calling is performed to return to a previous layer, an FP-Tree and a header table are created by using a next element of a header table of the previous layer and a conditional pattern base of the previous layer as a conditional pattern base, and turn to step 6; if the header table of the previous layer is empty, return to a previous layer; and if recursion calling is performed to return to a top layer and the header table is empty, the frequent pattern mining algorithm is ended and turn to step 7.

In step 7, the frequent patters are transformed into cyclic patterns:

cyclic patterns are generated from the frequent patterns attached with item position information in combination with magnitude of cycles.

The less the overhead in time is, the better the algorithm is. Correspondingly, in the data mining algorithm, the fewer the times of scanning the database are, the higher the efficiency of the algorithm in time is. Therefore, the efficiency of the algorithm in time may be transformed into the times of scanning the database in the algorithm.

The overhead of the algorithm in time with respect to the matter of data mining is basically represented as the number of affairs which need be simultaneously processed in the algorithm process, i.e., the size of data which need be simultaneously shifted into a memory for the algorithm to participate in algorithm work. However, the data cannot be separately shifted out of the memory. The fewer the operations of shifting a large batch of data into and out of the memory are, the better the algorithm is.

By adopting the method provided by this embodiment, the cyclic patterns in the time sequence can be accurately acquired; a great number of I/O operations can be reduced by scanning a raw data set twice; and by combining item position information and establishing an FP-Tree, not only can the execution efficiency of the algorithm be improved, but also the memory occupied for acquiring the cyclic patterns from raw data can be reduced. The time complexity of the algorithm provided by the present invention is $O(n \log n)$ and the space complexity is n. As compared with the existing cyclic pattern acquisition algorithms, the execution efficiency is higher.

The preferred embodiments of the present invention are as described above in detail. It should be understood that one skilled in the art may make various modifications and changes according to the concept of the present invention without contributing any inventive labor. Therefore, technical solutions which may be obtained by one skilled in the art through logic analysis, reasoning or limited experiments on the basis of the prior art according to the concept of the present invention should be all included in the protection scope defined by the claims.

What is claimed is:

1. A method for mining user cyclic patterns, characterized in that the method comprises the following steps:

S1: a user behavior recording module recording time of behaviors of each user;

S2: a user behavior time sequence generation module performing batch processing to the behaviors of each user to generate a time sequence of the behaviors of the user by using day as time granularity; and S3: a user behavior cyclic pattern acquisition module generating time sequence cyclic patterns from the time sequence according to frequent patterns, wherein step S3 comprises the following:

S3-1: reading the time sequence for a first time, segmenting the time sequence into subsequences according to magnitude of cycles, simultaneously adding each element in each subsequence to a position in a current sub-sequence, transforming the time sequence into item sets and statistically collecting times of occurrence of each item set in a data set:

S3-2: ranking items in each item set according to times of occurrence of the items in the data set from large to small;

S3-3: removing items which do not satisfy minimum times of occurrence according to the times of occurrence of the items;

S3-4: creating an Frequent Pattern-Tree and a header table by sequentially reading the item sets; creating a conditional pattern tree and establishing a new header table with a last item of the header table as a conditional pattern base; wherein a combination of conditional patterns and items in the header table is output as a frequent pattern; and S3-5: acquiring all frequent patterns of the data set and generating the time sequence cyclic patterns according to the frequent patterns.

2. The method for mining user cyclic patterns according to claim 1, characterized in that the method further comprises the following step:

S4: a user cyclic pattern storage module receiving the cyclic patterns generated by the user behavior cyclic pattern acquisition module, and storing the cyclic patterns, user identifiers and cycles in a database of the user cyclic pattern storage module.

3. The method for mining user cyclic patterns according to claim 1, characterized in that, in step S3, all of the frequent patterns of the data set are acquired by means of recursion according to a depth-first rule.

4. The method for mining user cyclic patterns according to claim 1, characterized in that, in step S3, a raw data set is scanned only twice.

* * * * *